(12) United States Patent
Spandley et al.

(10) Patent No.: US 11,570,850 B2
(45) Date of Patent: Jan. 31, 2023

(54) ELECTRO-THERMAL HEATING ELEMENTS

(71) Applicant: VESTAS WIND SYSTEMS A/S, Aarhus N (DK)

(72) Inventors: Luke Spandley, Ventnor (GB); Paul Badger, Salisbury (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 419 days.

(21) Appl. No.: 16/627,424

(22) PCT Filed: Jun. 15, 2018

(86) PCT No.: PCT/DK2018/050143
§ 371 (c)(1),
(2) Date: Dec. 30, 2019

(87) PCT Pub. No.: WO2019/001656
PCT Pub. Date: Jan. 3, 2019

(65) Prior Publication Data
US 2021/0153301 A1 May 20, 2021

(30) Foreign Application Priority Data
Jun. 29, 2017 (DK) .............................. PA201770519

(51) Int. Cl.
*H05B 3/00* (2006.01)
*F03D 80/40* (2016.01)

(52) U.S. Cl.
CPC ........... *H05B 3/0014* (2013.01); *F03D 80/40* (2016.05); *H05B 2203/007* (2013.01); *H05B 2203/017* (2013.01)

(58) Field of Classification Search
CPC .. H05B 3/0014; H05B 3/34; H05B 2203/007; H05B 2203/074; H05B 2203/037; H05B 2214/02; F03D 80/40; Y02E 10/72
See application file for complete search history.

(56) References Cited

U.S. PATENT DOCUMENTS

| 4,384,192 A | 5/1983 | Lowell et al. |
| 6,194,692 B1 * | 2/2001 | Oberle ...................... H05B 3/34 |
| | | 219/528 |
| 2003/0010773 A1 | 1/2003 | Fritz |

(Continued)

FOREIGN PATENT DOCUMENTS

| CN | 1672465 A | 9/2005 |
| DE | 102014106006 A1 | 11/2014 |

(Continued)

OTHER PUBLICATIONS

Danish Patent and Trademark Office Search Report for Application No. PA 2017 70519 dated Dec. 14, 2017.

(Continued)

*Primary Examiner* — Shawntina T Fuqua
(74) *Attorney, Agent, or Firm* — Patterson + Sheridan, LLP

(57) ABSTRACT

The present invention relates to methods and electro-thermal heating elements in which the electro-thermal heating element comprises a cut-out. Forming at least one multi-resistance patch for the cut-out and attaching the at least one multi-resistance patch to the electro-thermal heating element proximate to the cut-out.

22 Claims, 4 Drawing Sheets

(56) References Cited

U.S. PATENT DOCUMENTS

| | | | |
|---|---|---|---|
| 2010/0170889 A1* | 7/2010 | Keite-Telgenbuscher | ................... H05B 3/56 156/60 |
| 2011/0127249 A1* | 6/2011 | Tenias | ...................... A43B 3/35 36/2.6 |
| 2015/0283653 A1 | 10/2015 | Krueger et al. | |

FOREIGN PATENT DOCUMENTS

| | | |
|---|---|---|
| WO | 20100028653 A2 | 3/2010 |
| WO | 2015097219 A1 | 7/2015 |
| WO | 2019001656 A1 | 1/2019 |

OTHER PUBLICATIONS

Danish Patent and Trademark Office 1st Technical Examination for PA 2017 70519 dated Dec. 21, 2017.
PCT Written Opinion of the International Searching Authority for PCT/DK2018/050143.
PCT International Search Report for PCT/DK2018/050143 dated Sep. 24, 2018.
European Patent Office Examination for Application 18734427.0 dated Jul. 7, 2021.
Chinese Office Action for Application No. 201880042523.9 dated Jun. 18, 2020.

* cited by examiner

ELECTRO-THERMAL HEATING ELEMENTS

The present invention relates to Electro-Thermal Heating (ETH) elements for wind turbine blades and, in particular, to preventing hotspots in ETH elements.

BACKGROUND

Wind turbines generate electrical power from wind energy and can be situated on land or off-shore. Wind turbines situated in cold climates can suffer from icing events where ice may be formed on the surface of the wind turbine blades due to freezing water on the cold surface. The accumulation of ice on the surface of a blade can result in undesirable consequences. For example, a change in the profile of the wind turbine blades due to the accumulation of ice may reduce the speed of rotation of the wind turbine. As a result, the wind turbine may operate below optimal speed and efficiency which degrades the performance of the wind turbine. Also, the additional weight of the accumulating ice on the wind turbine blades may cause fatigue and stress failures of the blades.

Therefore, there is a need to be able to prevent or reduce the effects of icing on the blades of a wind turbine in order to prevent damage to the blades and also to increase the performance of a wind turbine.

Various systems and methods have been described to either, or both, to de-ice (e.g. remove ice accumulated) a wind turbine or to provide anti-icing (e.g. prevent ice from accumulating) for a wind turbine.

For example, it is known to attach heating mats to the wind turbine blades which, when supplied with electrical power, generate heat to increase the surface temperature of the surface of the blade. Such heating mats may be used for either or both of anti-icing or de-icing of the wind turbine blade.

The heating mats may cover a significant proportion of the blade and/or be located where anti-icing/de-icing is required. Once laid on or in the blade structure it may be necessary to cut-out a portion of the heating mat, for example, for lightning receptor bolts, connectors, fasteners, ballast drilling, or for any other reason.

However, a cut-out in the heating mat may cause hotspots to form which could be disadvantageous to the efficiency and health of the heating mat and/or the blade structure. The cut-outs can impact the current flow through the heating mat which can cause localized heating i.e. hotspots near to the cut-out.

The present invention seeks to address, at least in part, the problems and disadvantages described hereinabove and to seek to prevent or reduce hotspots in the heating mat caused by cut-outs in the heating mat.

SUMMARY OF THE INVENTION

According to a first aspect of the present invention there is provided a method of forming an electro-thermal heating element comprising: forming a cut-out in the electro-thermal heating element; forming at least one multi-resistance patch for the cut-out; and attaching the at least one multi-resistance patch to the electro-thermal heating element proximate to the cut-out.

The present invention therefore advantageously enables the prevention or reduction in hot-spots caused by the cut-out in the Electro-Thermal Heating element by attaching at least one multi-resistance patch to the Electro-Thermal Heating element.

The at least one multi-resistance patch may be formed as a multi-layer resistance patch comprising at least two layers. Each layer of the at least one multi-layer resistance patch may be formed with different dimensions such that each subsequent layer has a shorter dimension in at least one direction to the previous layer.

The at least one multi-resistance patch may be formed as a single layer comprising at least two sections of differing resistance and/or conductive material. Each section of the at least one multi-resistance patch may be formed with different dimensions such that each subsequent section has a shorter dimension in at least one direction to the previous layer.

One edge of the at least one multi-resistance patch may be shaped to substantially match a shape of an edge of the cut-out. The shape of at least one of the multi-resistance patches may be formed as any one of a circular sector shape, a rectangular shape, an oval shape, and a square shape.

One of the at least one multi-resistance patches may be shaped to substantially match an edge of the electro-thermal element.

The at least one multi-resistance patch may be formed of substantially the same materials and properties as the electro-thermal heating element to which the multi-resistance patch is attached.

The attached multi-resistance patch may prevent or reduce hotspots in the electro-thermal element near to the cut-out.

The multi-resistance patch may be attached to the electro-thermal heating element using one or more of adhesive, stitching, and staples.

According to a second aspect of the present invention there is provided an electro-thermal heating element comprising: a cut-out formed in the electro thermal heating element; and at least one multi-resistance patch attached to the electro-thermal heating element proximate to the cut-out.

The at least one multi-resistance patch may be formed as a multi-layer resistance patch comprising at least two layers. Each layer of the at least one multi-layer resistance patch may comprises at least one different dimension such that each subsequent layer has a shorter dimension in at least one direction to the previous layer.

The at least one multi-resistance patch may be formed as a single layer comprising at least two sections of differing resistance and/or conductive material. Each section of the at least one multi-resistance patch may comprise at least one different dimension such that each subsequent section has a shorter dimension in at least one direction to the previous layer.

One edge of the at least one multi-resistance patch may be shaped to substantially match a shape of an edge of the cut-out. The shape of at least one of the multi-resistance patches is formed as any one of a circular sector shape, a rectangular shape, an oval shape, and a square shape. One of the at least one multi-resistance patches may be shaped to substantially match an edge of the electro-thermal element.

The at least one multi-resistance patch may be formed of substantially the same materials and properties as the electro-thermal heating element to which the multi-resistance patch is attached. The attached multi-resistance patch may substantially prevent or reduce hotspots in the electro-thermal element near or proximate to the cut-out.

The multi-resistance patch is attached to the electro-thermal heating element using one or more of adhesive, stitching, and staples.

DRAWINGS

Embodiments of the present invention will now be described, by way of example only, and with reference to the accompanying drawings, in which.

EMBODIMENTS

Figure 1:
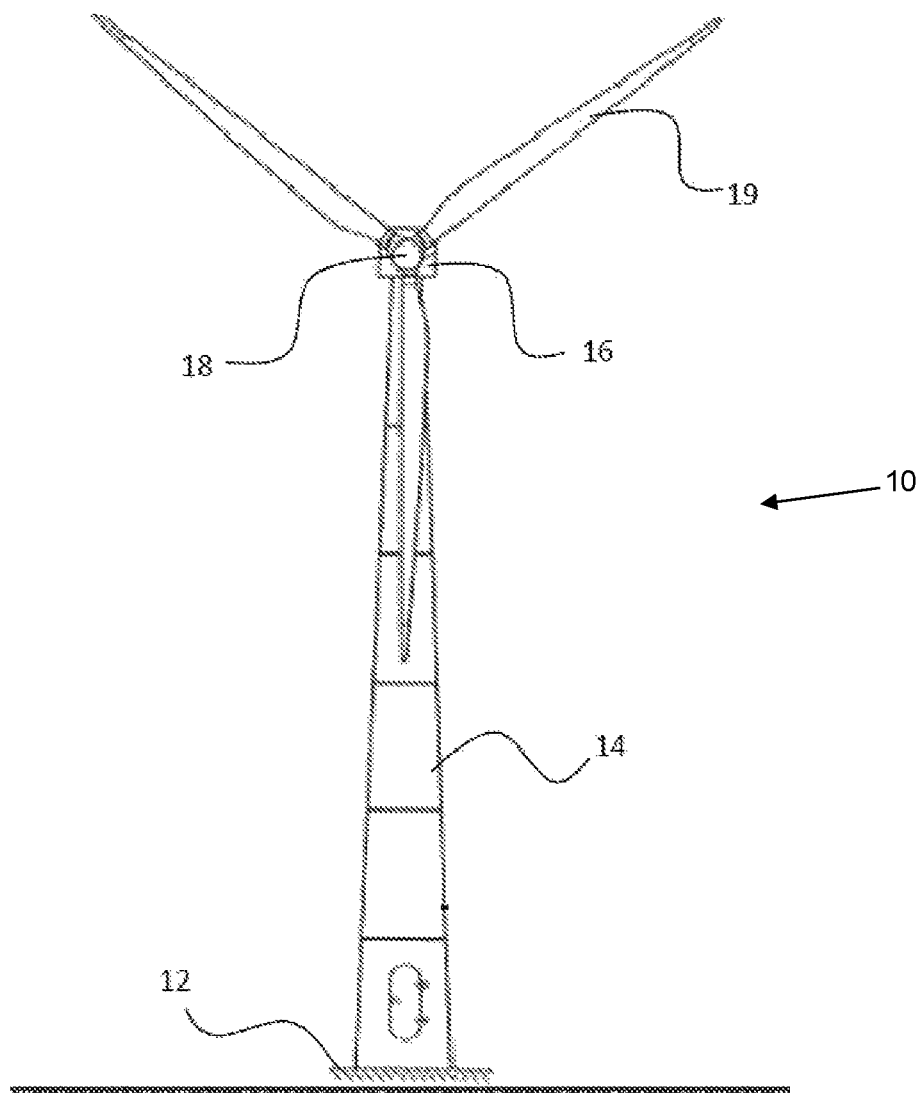
FIG. 1 shows a schematic of a wind turbine according to one or more embodiments of the present invention.

FIG. 1 shows a schematic of a typical wind turbine 10 which includes embodiments of wind turbine blades 19 according to the present invention. The wind turbine 10 is mounted on a base 12 which may be onshore foundations or off-shore platforms or foundations. The wind turbine includes a tower 14 having a number of tower sections. A nacelle 16 is located and attached to the top of tower 14. A wind turbine rotor, connected to the nacelle 16, includes a hub 18 and at least one wind turbine blade 19, where in FIG. 1 three wind turbine blades are shown although any number of wind turbine blades 19 may be present depending on the design and implementation of the wind turbine 10. The wind turbine blades 19 are connected to the hub 18 which in turn is connected to the nacelle 16 through a low speed shaft which extends out of the front of the nacelle 16.

In order to substantially prevent, or reduce, ice accretion on wind turbine blades, the blades may be fitted with Electro-Thermal Heating (ETH) elements, e.g. a heating mat, which can generate heat in order to heat the surface of the wind turbine blade. The ETH elements are supplied with electrical power and due to the level of electrical power along with the predetermined resistance of the ETH element, it generates the required level of heat which is used to heat the surface of the blade to prevent or reduce ice accretion on the blade. The ETH elements are typically fabricated from a lightweight resistive material which have specific dimensions and resistive properties that enable the ETH element to produce the required levels of heat for the location and requirements of the heating system for the blades.

ETH elements that are attached to, or embedded within, a wind turbine blade may require cut-outs to be formed within the ETH elements to accommodate various components, e.g. lightning receptor bolts, connectors, fasteners, ballast drilling, or for any other reason.

Figure 2:
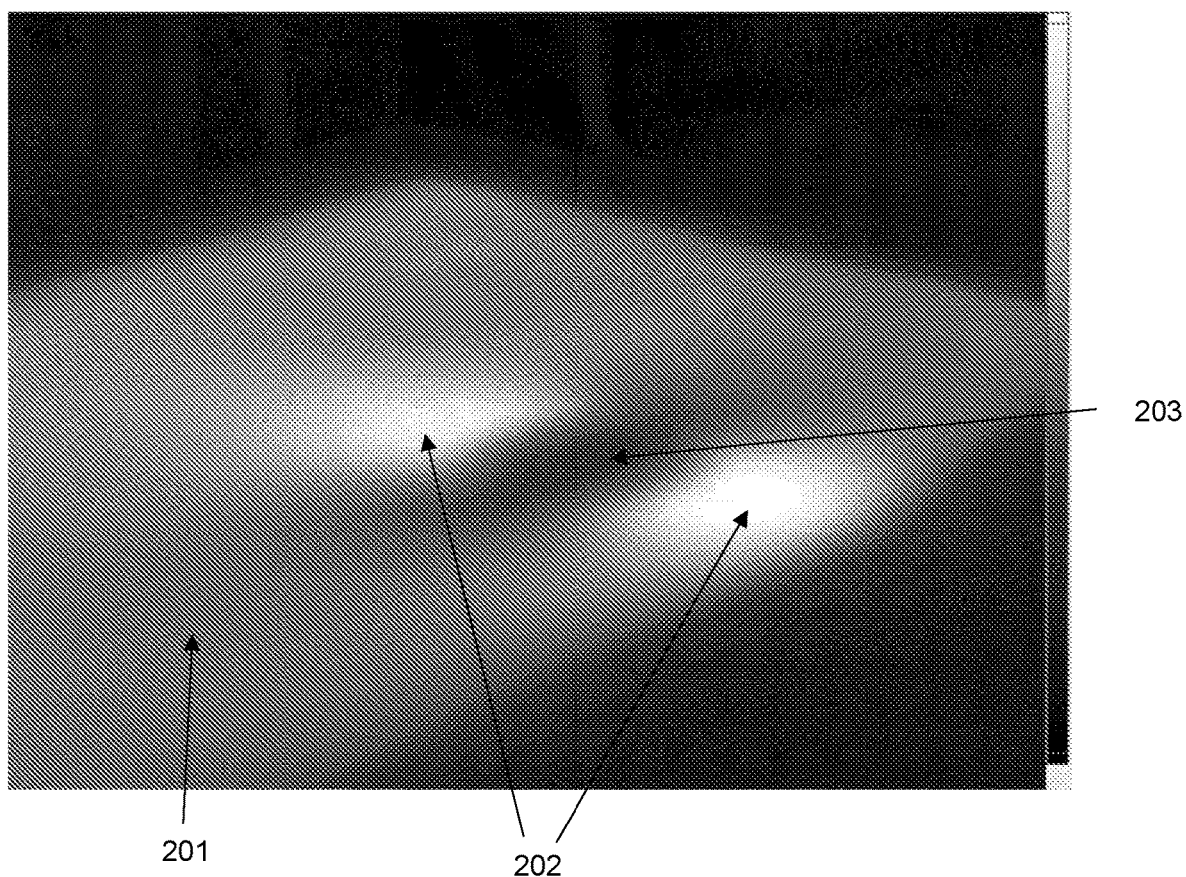
FIG. 2 shows a thermal image of hotspots near a cut-out in a heating mat.

However, cut-outs formed in the ETH elements prevent the electrons from flowing uniformly across the ETH element causing the electrons to flow around the formed cut-out. This causes a greater concentration of the flow of electrons at specific locations around the cut-out which in turn causes hotspots, as shown in FIG. 2. The hotspots 202 caused by the cut-out 203 can cause damage to the ETH element 201 and/or the blade surface which can substantially affect the effectiveness of the ETH element 201 as well as potentially cause a fire or damage to the blade structure and surface.

In order to prevent or substantially reduce the hotspots 202 from being generated in the ETH element 201 at locations around the cut-out 203, one or more multi-resistance patches can be attached to the ETH element 201 proximate to the cut-out 203. The multi-resistance patches effectively provide additional channels or paths for the electrons to flow around the cut-out 203 which reduces the hotspots 202 around the cut-outs 203.

The multi-resistance patch may be formed of a single layer wherein the single layer has two or more sections of different resistances, where the lower resistance section is to be located proximate to the cut-out. Alternatively, or additionally, the multi-resistance patch may be formed of two or more layers with each subsequent layer positioned on top of a preceding layer wherein the number of layers reduce at predetermined dimensions in a direction away from the cut-out.

The multi-resistance patch may be attached to the ETH element by, for example, adhesive, staples, stitching, or any other suitable means to ensure a good electrical contact between the multi-resistance patch and the ETH element.

In the following examples, described with reference to FIGS. 3 to 5, the multi-resistance patch is formed as a multi-layer resistance patch having three layers. However, as will be appreciated, the principle of the invention is also applicable to other forms of multi-resistance patch, such as one formed of a single layer with two or more sections having different resistances.

In the following examples, described with reference to FIGS. 3 to 5, the multi-layer resistance patch is formed using the same material as the ETH elements and therefore each layer has the same resistive properties as the ETH element. The shape and dimensions of the multi-layer resistance patches are predetermined based on the location and shape of the cut-out formed in the ETH element. The number of multi-layer resistance patches that are attached to the ETH element proximate to the cut-out is dependent on the shape and/or location of the cut-out formed in the ETH element.

Figure 3:
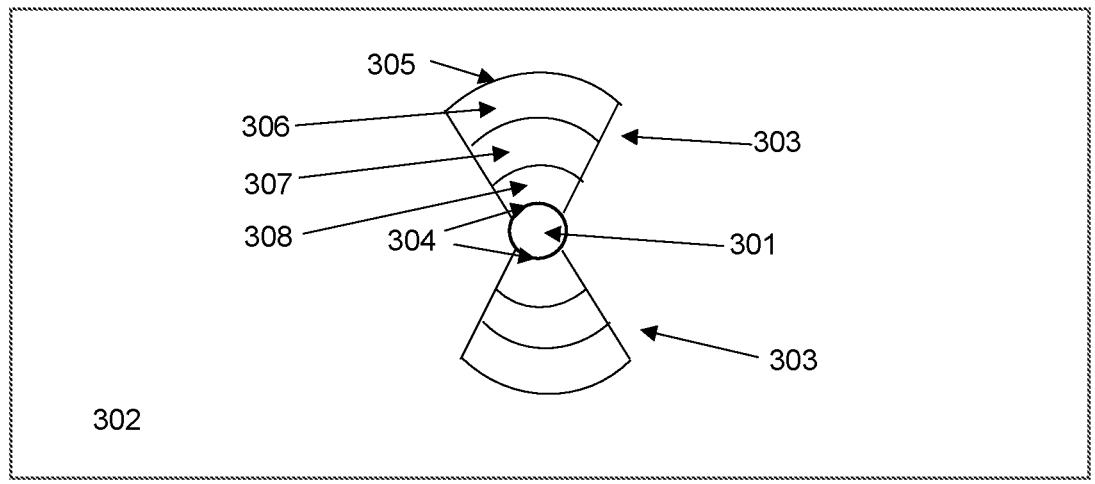
FIG. 3 shows a schematic of a multi-resistance patch attached to a heating mat for a cut-out towards the centre of the heating mat according to one or more embodiments of the present invention.

With reference to FIG. 3, an example is shown where a cut-out 301 is formed in the centre of the ETH element 302. In this example, the cut-out 301 is of a substantially circular shape (for example to allow a bolt through the ETH element 302) and the multi-layer resistance patch 303 is of a circular sector shape having a first arc that substantially matches the circular arc of the cut-out 301 wherein the first arc 304 of the multi-layer resistance patch 303 is located proximate to the cut-out 301 and a second arc 305 that is larger than the first arc 304 located at a predetermined distance from the first arc 304.

The multi-layer resistance patch of this example comprises three layers 306, 307, 308, wherein each subsequent circular sector layer is positioned on top of the previous layer. Each subsequent circular sector layer has a shorter radius to the previous layer so that at predetermined distances from the cut-out 301 there are a different number of layers of the multi-layer resistance patch. As such, the number of layers of the multi-resistance patch effectively reduces the further away from the cut-out 301. Thus, in this example, there are 3 layers 306, 307, 308 adjacent to the cut-out 301, 2 layers 306, 307 at a predetermined distance or radius from the cut-out 301, and a single layer 306 at the furthest point of the multi-layer resistance patch from the cut-out 301.

In this example, as the cut-out 301 is formed towards the centre of the ETH element 302 then two multi-layer resistance patches 303 are attached to the ETH element one on either side of the cut-out.

The multi-resistance patch 303 is attached to the ETH element 302 proximate to the cut-out 301. In this example, the multi-resistance patches 303 are attached in a direction that is substantially perpendicular to the current flow through the ETH element 302. The multi-resistance patches may be of any suitable dimension and shape for the purpose of the invention. In the present example, the cut-out 301 has is circular and has a radius R and the predetermined distance of the top layer 308 of the multi-layer resistance patches from the cut-out is 2R, the predetermined distance of the middle layer 307 of the multi-layer resistance patches from the cut-out is 3R and the predetermined distance of the bottom layer 306 of the multi-layer resistance patches from the cut-out is 4R.

Figure 4:
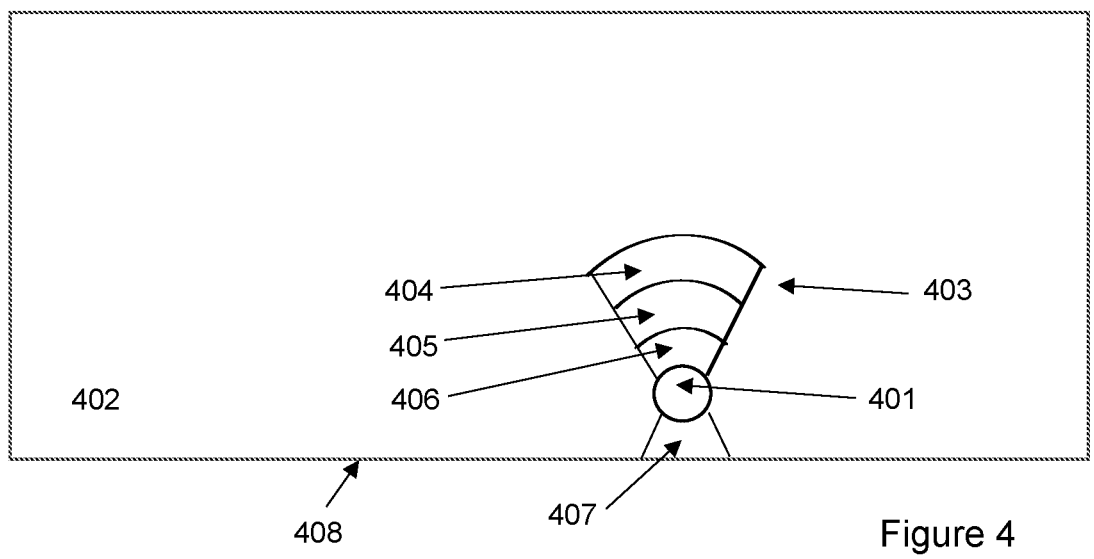
FIG. 4 shows a schematic of a multi-resistance patch attached to a heating mat for a cut-out towards an edge of the heating mat according to one or more embodiments of the present invention.

In a further example shown in FIG. 4, a cut-out 401 is formed close to an edge of the ETH element 402 where the cut-out 401 is again of a circular shape. In this example a multi-layer resistance patch 403 is attached to proximate to the cut-out 401 on one side of the cut-out 401 in a direction that is perpendicular to the current flow through the ETH element 402 towards a centre line of the ETH element 402. The multi-layer resistance patch 403 is of the same structure and dimensions as described in relation to FIG. 3 hereinabove. That is, the multi-resistance patch 403 is of a circular sector shape and comprises three layers 404, 405, 406 wherein each subsequent layer reduces in radius at predetermined distances from the cut-out 401.

However, as the cut-out 401 is relatively close to an edge of the ETH element 402, a second multi-layer resistance patch 407 is attached to the ETH element 402 that extends from proximate to the cut-out 401 to at least one edge 408 of the ETH element 402. In this example, the multi-layer resistance patch 407 is formed of three layers and where one or more of the layers extends past the edge of the ETH element, the respective layers are trimmed to substantially match the edge of the ETH element. In the example shown in FIG. 4 the edge of the ETH element is within the radius of all three layers and as such all layers are trimmed to match the edge of the ETH element. However, as will be appreciated, if the cut-out was formed further towards the center line of the ETH element such that the edge of the ETH element falls within layer 404 and/or 405 then the respective layers will be trimmed to match the edge of the ETH element. Therefore, as the cut-out is close to the edge of the ETH element then each of the layers of the multi-layer resistance patch do not reduce in dimension or change their shape but are trimmed to match the edge of the ETH element.

Figure 5:
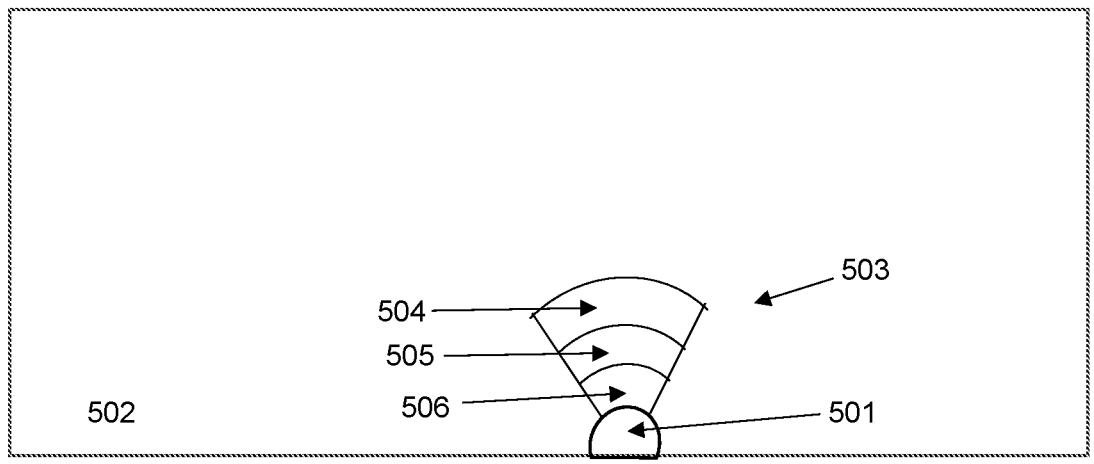
FIG. 5 shows a schematic of a multi-resistance patch attached to a heating mat for a cut-out at an edge of the heating mat according to one or more embodiments of the present invention.

In a further example shown in FIG. 5, a semicircle cut-out 501 is formed on the edge of the ETH element 502. In this example a multi-layer resistance patch 503 is attached to proximate to the cut-out 501 on one side of the cut-out 501 in the direction of the centre line of the ETH element 502 and perpendicular to the flow of electrical current through the ETH element 502. The multi-layer resistance patch 503 is of the same structure and dimensions as described in relation to FIG. 3 and FIG. 4 hereinabove. That is, the multi-resistance patch is of a circular sector shape and comprises three layers 504, 505, 506 wherein each subsequent layer reduces in radius the further from the cut-out at predetermined distances from the cut-out.

However, as the cut-out is on the edge of the ETH element then only a single multi-layer resistance patch is required.

In the above examples, the multi-resistance patch was formed of three layers in a circular sector shape, each subsequent layer positioned on top of the preceding layer wherein each subsequent layer has a lower radius to the preceding layer. However, as will be appreciated, the multi-resistance patch may be any suitable shape or construction for the purpose of preventing or substantially reducing hot-spots near to a cut-out in the ETH element. Several further non-limiting examples will be provided with reference to FIG. 6.

Figure 6A:
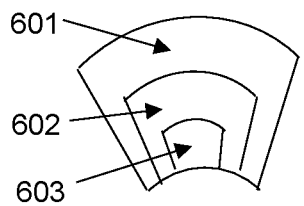
FIG. 6 shows further examples of a multi-resistance patch according to one or more embodiments of the present invention.

FIG. 6a shows a multi-layer multi-resistance patch in which the width of subsequent layers 601, 602, 603 is also reduced along with the radius.

Figure 6B:
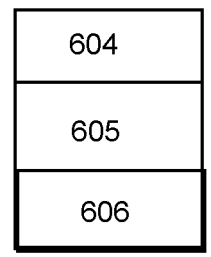
Figure 6C:
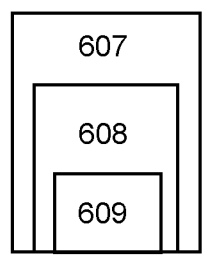

FIG. 6b shows a rectangular multi-layer multi-resistance patch with three layers 604, 605, 606 where each subsequent layer is of a reduced length than the preceding layer. FIG. 6c shows a rectangular multi-layer multi-resistance patch with three layers 607, 608, 609 where each subsequent layer is of a reduced length and width than the preceding layer.

Figure 6D:
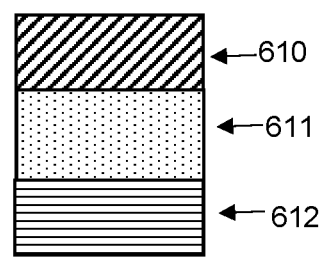

FIG. 6d shows a single layer multi-resistance patch that includes three sections 610, 611, 612 wherein each subsequent section has a reduced resistance or conductive material to the preceding section. In FIG. 6d the shape of the multi-resistance patch is of rectangular shape, however, as will be appreciated the multi-resistance patch may be any shape, e.g. a circular sector fan shape, square, oval, and one or more dimensions may be reduced for each section, similar to the examples shown in FIGS. 3 to 5.

FIG. 6 shows several non-limiting examples of different multi-resistance patches however, as will be appreciated, the shape of the patches may be any suitable shape, e.g. circular sector/fan shape, rectangular shape, square shape, oval shape or any other suitable shape. In the examples of a multi-layer multi-resistance patch there may be any number of layers, e.g. 2, 3, 4, 5, 6, and so on. In the examples of a single layer multi-resistance patch with different sections of resistance/conductive material there may be any number of sections, e.g. 2, 3, 4, 5, 6, and so on.

The material for the multi-resistance patch may be the same as the ETH element or may be a different material.

The edge of the multi-resistance patch proximate to the cut-out is preferably substantially the same shape and contour as the edge of the cut-out for the portion of the cut-out to which the multi-resistance patch is attached proximate to.

Each subsequent layer or section may differ in one or more of radius, width, length, resistance, conductive material concentration, and thickness.

The present invention advantageously prevents or reduces the occurrence of hotspots near or proximate to any cut-out in the ETH element by attaching a multi-resistance patch proximate to the cut-out. The multi-resistance path effectively provides additional flow paths for the current around the cut-out which prevents or reduces the localized heating caused by the cut-out in the ETH element.

The examples and embodiments described above are for example purposes only, and it will be appreciated that features of different embodiments or examples may be combined with one another. Embodiments of the present invention have been described, by way of example only, and many modifications or changes may be made to the embodiments and be within the scope of the appended claims.

The invention claimed is:

1. A method of forming an electro-thermal heating element comprising:
   forming a cut-out in the electro-thermal heating element;
   forming a multi-resistance patch for the cut-out, the multi-resistance patch comprising (i) multiple layers having different resistances or (ii) sections of material having different resistances; and
   attaching the multi-resistance patch to the electro-thermal heating element proximate to the cut-out.

2. The method as claimed in claim 1, wherein the multi-resistance patch comprises the multiple layers.

3. The method as claimed in claim 2, wherein each layer of the multiple layers is formed with different dimensions such that each subsequent layer has a shorter dimension in at least one direction to the previous layer.

4. The method as claimed in claim 1, wherein the multi-resistance patch comprises the sections having different resistances.

5. The method as claimed in claim 4, wherein each section of the sections is formed with different dimensions such that each subsequent section has a shorter dimension in at least one direction to the previous section.

6. The method as claimed in claim 1, wherein one edge of the multi-resistance patch is shaped to substantially match a shape of an edge of the cut-out.

7. The method as claimed in claim 1, wherein the shape of the multi-resistance patch is formed as any one of a circular sector shape, a rectangular shape, an oval shape, and a square shape.

8. The method as claimed in claim 1, wherein the multi-resistance patch is shaped to substantially match an edge of the electro-thermal element.

9. The method as claimed in claim 1, wherein the multi-resistance patch is formed of substantially the same materials and properties as the electro-thermal heating element to which the multi-resistance patch is attached.

10. The method as claimed in claim 1, wherein the attached multi-resistance patch reduces hotspots in the electro-thermal element near to the cut-out.

11. The method as claimed in claim 1, wherein the multi-resistance patch is attached to the electro-thermal heating element using one or more of adhesive, stitching, and staples.

12. An electro-thermal heating element comprising:
    a cut-out formed in the electro thermal heating element; and
    a multi-resistance patch attached to the electro-thermal heating element proximate to the cut-out, the multi-resistance patch comprising (i) multiple layers having different resistances or (ii) sections of material having different resistances.

13. The electro-thermal heating element as claimed in claim 12, wherein the multi-resistance patch comprises the multiple layers.

14. The electro-thermal heating element as claimed in claim 13, wherein each layer of the multiple layers comprises at least one different dimension such that each subsequent layer has a shorter dimension in at least one direction to the previous layer.

15. The electro-thermal heating element as claimed in claim 12, wherein the multi-resistance patch comprises the sections having different resistances.

16. The electro-thermal heating element as claimed in claim 15, wherein each section of the sections comprises at least one different dimension such that each subsequent section has a shorter dimension in at least one direction to the previous section.

17. The electro-thermal heating element as claimed in claim 12, wherein one edge of the multi-resistance patch is shaped to substantially match a shape of an edge of the cut-out.

18. The electro-thermal heating element as claimed in claim 12, wherein the shape of the multi-resistance patch is formed as any one of a circular sector shape, a rectangular shape, an oval shape, and a square shape.

19. The electro-thermal heating element as claimed in claim 12, wherein the multi-resistance patch is shaped to substantially match an edge of the electro-thermal element.

20. The electro-thermal heating element as claimed in claim 12, wherein the multi-resistance patch is formed of substantially the same materials and properties as the electro-thermal heating element to which the multi-resistance patch is attached.

21. The electro-thermal heating element as claimed in claim 12, wherein the multi-resistance patch reduces hotspots in the electro-thermal element near to the cut-out.

22. The electro-thermal heating element as claimed in claim 12, wherein the multi-resistance patch is attached to the electro-thermal heating element using one or more of adhesive, stitching, and staples.

* * * * *